US006973440B1

(12) United States Patent
Gudio

(10) Patent No.: US 6,973,440 B1
(45) Date of Patent: Dec. 6, 2005

(54) METHOD OF MANAGING A DEPOSIT EXCHANGE TO OFFER PRICE REDUCTIONS

(76) Inventor: Brian Gudio, 627 Grand Ave., St. Paul, MN (US) 55105

( * ) Notice: Subject to any disclaimer, the term of this patent is extended or adjusted under 35 U.S.C. 154(b) by 122 days.

(21) Appl. No.: 10/076,995

(22) Filed: Feb. 19, 2002

(51) Int. Cl.⁷ .............................................. G06F 17/60
(52) U.S. Cl. ......................................... 705/37; 705/26
(58) Field of Search ............................... 705/14, 26, 37

(56) References Cited

U.S. PATENT DOCUMENTS

| | | | | |
|---|---|---|---|---|
| 5,537,314 A | * | 7/1996 | Kanter | 705/14 |
| 5,621,640 A | * | 4/1997 | Burke | 705/14 |
| 5,915,244 A | * | 6/1999 | Jack et al. | 705/14 |
| 5,970,480 A | * | 10/1999 | Kalina | 705/37 |
| 6,009,412 A | * | 12/1999 | Storey | 705/14 |
| 6,058,371 A | * | 5/2000 | Djian | 705/14 |
| 6,138,911 A | * | 10/2000 | Fredregill et al. | 235/383 |
| 6,178,408 B1 | * | 1/2001 | Copple et al. | 705/14 |
| 6,330,544 B1 | * | 12/2001 | Walker et al. | 705/14 |
| 6,553,347 B1 | * | 4/2003 | Tavor et al. | 705/14 |
| 6,594,640 B1 | * | 7/2003 | Postrel | 705/14 |
| 2002/0082985 A1 | * | 6/2002 | MacKay | 705/39 |
| 2002/0095365 A1 | * | 7/2002 | Slavin et al. | 705/37 |

FOREIGN PATENT DOCUMENTS

| | | | | |
|---|---|---|---|---|
| EP | 0 902 381 A2 | * | 3/1999 | G06F 17/60 |
| WO | WO 01/09782 A2 | * | 8/2001 | G06F 17/60 |

OTHER PUBLICATIONS

Smith et al., Take another look at bank-owned life insurance, ABA Banking Journal, Feb., 1997, vol. 89, iss. 2, pp. 22, 3 pages.*

* cited by examiner

Primary Examiner—Mark Fadok
(74) Attorney, Agent, or Firm—Thomas B. Tate

(57) ABSTRACT

A business method which uses a computer program to establish and maintain a deposit exchange. Customers deposit money with the deposit exchange and register with clients of the deposit exchange to use these deposits as discounts toward the price of goods or services the customer buys from the client. These discounts accumulate according to a formula similar to that used to calculate compound interest.

1 Claim, 1 Drawing Sheet

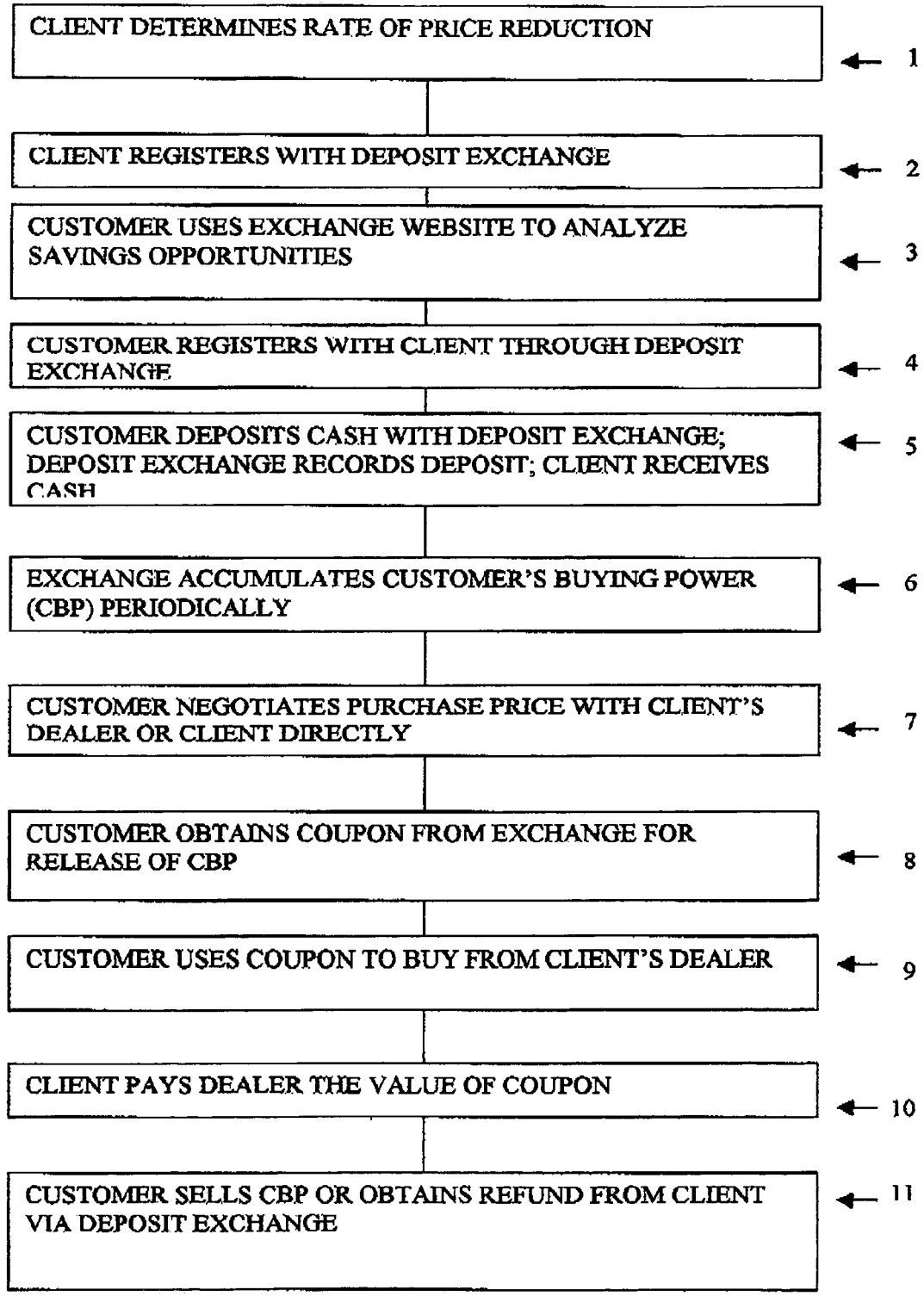

METHOD OF MANAGING A DEPOSIT EXCHANGE TO OFFER PRICE REDUCTIONS

BACKGROUND OF THE INVENTION

The field of the invention is business methods, specifically tax-efficient price reduction management methods.

The concept of depositing money with an institution in order to earn compound interest is well-known. The concept of buying expensive goods by making installment payments is also well-known. However, business methods which would allow a consumer to save money toward a large purchase without either the consumer or the merchant realizing taxable income are not known to exist in the prior art.

SUMMARY OF THE INVENTION

The business method establishes and maintains a deposit exchange which enables client companies to reduce the price of future sales in exchange for cash today, and which enables customers to accrue customer buying power toward purchasing goods from the deposit exchange's client companies.

Advantages of this method include: it is a savings program, deposits are made periodically to reduce the purchase price over time, no true interest is paid on these deposits, deposits are insured by a third-party insurance company, and discounts attach to the deposits so that a secondary market can be created in order to allow the customer to sell the value of the deposits and accrued discount, and therefore not lose all time value of the money if the purchase is not completed.

I believe that this method will not result in taxable income to either the customer or the merchant. The customer maintains complete dominion over the deposit; therefore it is not considered payment for the purchase, but rather is a loan to the merchant in exchange for the discount in purchase price to accrue. According to the U.S. Supreme Court in Commissioner v. Indianapolis Power & Light Co., 493 U.S. 203 (1990), these payments are not taxable income to the merchant. According to a recent IRS private letter ruling, if it is negotiated and agreed upon before the transaction that the customer cannot use the deduction unless he purchases the product, the customer does not realize income.

DESCRIPTION OF THE DRAWING

The FIGURE is a block diagram showing the steps in the method.

DETAILED DESCRIPTION OF THE INVENTION

The deposit exchange enables its client companies to reduce the price of future sales in exchange for cash today. The deposit exchange uses the rate of price reduction on future sales, $K_d$ like interest in the standard time value of money formula to calculate future value. $K_d$ will vary depending on the needs of the client.

$K_d$ calculates or increases customer buying power (CBP). CBP equals the value of cash collected by the deposit exchange and paid to client companies by the deposit exchange, plus the accrued discount on future sales by client companies calculated by the deposit exchange. CBP is owned by customers (individuals or businesses who register with the deposit exchange and its client companies). CBP has a definite cash value and a possible market value. To provide liquidity, the deposit exchange provides a secondary market for customers to sell their CBP to the highest bidder.

The business method disclosed herein uses a computer program to establish and maintain a database in order to allow the deposit exchange to operate effectively. In the preferred embodiment of the invention, an Internet website will be set up and will operate as the medium through which business will be transacted. The business method comprises eleven steps as follows.

Step 1: The client companies, who at first will be manufacturers of goods but later will also include providers of services, determine the rate of price reduction ($K_d$) for their goods or services, by taking into account their incremental borrowing rate and marketing rate.

Step 2: The client companies register their respective rates of price reduction with the deposit exchange, using links connecting the clients and deposit exchange.

Step 3: A customer logs on to the deposit exchange's website, interacts with the deposit exchange's clients, and uses the website to analyze the savings opportunity in order to decide whether or not to deposit cash. The deposit exchange provides the following: a savings calculator, interactive financial budgeting advice, on-line registration, on-line viewing of customer account, on-line payment facilitation, shows estimated taxes avoided, shows how competing stock market compares, current value of account if sold, and on-line sale of deposit with accrued discount.

Step 4: The customer registers with one or more specific clients through the deposit exchange by entering his name, a password, and the names of the clients with whom he wishes to register.

Step 5: The customer periodically (preferably monthly) deposits cash with one or more of the deposit exchange's clients through the deposit exchange, which records the transaction. Before the end of the business day, the deposit exchange deposits the funds in the proper client account. The deposit exchange maintains a record of the customer's deposit or customer buying power (CBP). The client receives the cash.

Step 6: The deposit exchange accumulates the customer's price reduction periodically, preferably monthly, but other periods, for example, quarterly, semi-annually, or annually, may be used. The formula used is that which is used for calculating compound interest. CBP in the first month is the customer's deposit. CBP increases with each compounding period. The formula is $(K_{d/12}*CBP)+CBP$. CBP in the following month equals the deposit plus accrued discount on a future purchase. CBP grows over time.

Step 7: The customer shops at one of the client's dealers and negotiates a price to buy goods or services from that dealer.

Step 8: The customer obtains a customer and client specific coupon from the deposit exchange, printing out the coupon to release the customer's CBP. The coupon has a control number in a UPC format and a face value. PIN numbers validate the coupon. The coupon is safer to use than cash.

Step 9: The customer uses the numbered coupon to buy the goods or services from the client's dealer for the price previously negotiated.

Step 10: The dealer transmits the numbered coupon electronically through the deposit exchange to the client, who pays the dealer the value of the coupon.

Step 11: The customer may sell his unused CBP on the market or may obtain a refund from the deposit exchange.

If the customer elects to sell, the procedure is as follows: The current customer puts the deposit and discount on the market by listing his selling price on the deposit exchange's website. A new customer registers seeking to buy a discount and deposit, and lists his buying price. The deposit exchange matches customers who want to buy and sell for the same price. The first customer sells his accumulated CBP. The client retains the deposit. The second customer may continue to add deposits to the CBP he purchased or he may use the CBP immediately to purchase goods or services from the client.

If a customer negotiates a price from the client's dealer which is below the customer's total CBP, the customer uses cash for the purchase first, the remaining cash can be refunded, and at the option of the client, the customer can sell the discount or the client may eliminate the discount. Any secondary buyer may obtain a cash refund from a client.

If the customer requests a refund of his deposit, the procedure is as follows: The deposit exchange handles the customer's refund request within two weeks. The deposit exchange will allow sales up to the last day of this period. The deposit exchange electronically notifies the client, who returns the customer's deposit. The client decides on the disposition of the accrued discount. The client may maintain the accrued discount or a portion of it for the customer to use if he later re-establishes his deposit. Alternatively, the client may eliminate the accrued discount.

I claim:

1. A price reduction management method, which uses a computer program and links to establish and maintain and communicate with a central deposit exchange, said method comprising the following steps:

establishing through the links at the central deposit exchange a client's customer rate of price reduction for a client's goods and services, and registering said client's customer rate with said central deposit exchange;

registering a customer with specific clients of said deposit exchange through means provided to contact a central deposit exchange website to evaluate client rate offers;

said customer accumulating customer buying power (CBP) by periodically depositing cash with one or more central deposit exchange clients, maintaining a record utilizing said computer program of customer cash deposits at the central deposit exchange, and distributing through the central deposit exchange, the customer deposits cash to a selected one or more clients;

determining by the central deposit exchange for said customer, a price reduction on said client's goods and services, wherein said price reduction is calculated using the formula $(K_{d/12} * CBP) + CBP$, wherein $K_d$ is said rate of price reduction and CBP is a customer's buying power;

said customer negotiating a price to purchase goods or services from one or more of client's dealers;

said central deposit exchange having means to print out a coupon from said deposit exchange to release said customer's buying power to the customer;

said customer purchasing goods or services from said client's dealer using said coupon;

said client paying said dealer the value of said coupon;

the method further providing; means for selling part or all of the customer's unused accumulated buying power to another customer, or alternatively, obtaining a refund of part or all of the customer's unused deposit from said central deposit exchange.

\* \* \* \* \*